(12) United States Patent
Hopfen et al.

(10) Patent No.: US 11,260,799 B2
(45) Date of Patent: Mar. 1, 2022

(54) SLIDING DOOR ASSEMBLY FOR A CUP HOLDER OR OTHER STORAGE COMPARTMENT OF A VEHICLE

(71) Applicant: Volvo Car Corporation, Gothenburg (SE)

(72) Inventors: Artur Hopfen, Gothenburg (SE); Joakim Ringdahl, Gothenburg (SE)

(73) Assignee: Volvo Car Corporation, Gothenburg (SE)

(*) Notice: Subject to any disclaimer, the term of this patent is extended or adjusted under 35 U.S.C. 154(b) by 286 days.

(21) Appl. No.: 16/583,404

(22) Filed: Sep. 26, 2019

(65) Prior Publication Data
US 2021/0094475 A1    Apr. 1, 2021

(51) Int. Cl.
*B60R 7/04* (2006.01)

(52) U.S. Cl.
CPC ...................... *B60R 7/04* (2013.01)

(58) Field of Classification Search
CPC ..... B60R 7/04; B60R 2011/0003; B60R 7/00; B60R 2011/0094
USPC ........................... 296/37.8, 24.34, 37.1, 1.08
See application file for complete search history.

(56) References Cited

U.S. PATENT DOCUMENTS

| | | | |
|---|---|---|---|
| 10,196,001 B2* | 2/2019 | Gillis | B60R 7/04 |
| 2018/0118121 A1* | 5/2018 | Gorman, Jr. | B29C 69/02 |
| 2018/0370445 A1* | 12/2018 | Gillis | E05D 15/0621 |
| 2019/0135153 A1* | 5/2019 | Kim | B60R 7/04 |
| 2019/0276195 A1* | 9/2019 | Nomoto | B60R 7/04 |
| 2020/0199926 A1* | 6/2020 | Tewes | E05F 1/16 |

\* cited by examiner

*Primary Examiner* — D Glenn Dayoan
*Assistant Examiner* — E Turner Hicks
(74) *Attorney, Agent, or Firm* — Clements Bernard Walker; Christopher L. Bernard

(57) ABSTRACT

A sliding door assembly for selectively covering a cup holder or other storage compartment of a vehicle, the sliding door assembly including: a pair of opposed rails adapted to be disposed on opposed sides of an opening of the cup holder or other storage compartment; and a panel door including a plurality of adjacent slats adapted to be disposed between the pair of opposed rails, wherein one or more of the plurality of adjacent slats includes a central body portion with a clamp structure disposed at each end of the central body portion, wherein each of the clamp structures is adapted to grasp one of the pair of opposed rails to translatably secure the panel door to the pair of opposed rails. The sliding door assembly also includes a cover panel adapted to be disposed between the pair of opposed rails.

21 Claims, 6 Drawing Sheets

SLIDING DOOR ASSEMBLY FOR A CUP HOLDER OR OTHER STORAGE COMPARTMENT OF A VEHICLE

TECHNICAL FIELD

The present disclosure relates generally to the automotive field. More particularly, the present disclosure relates to a sliding door assembly for a cup holder or other storage compartment of a vehicle.

BACKGROUND

In many modern vehicles, cup holders and/or other storage compartments are provided in consoles between the seats, as well as in other locations. These cup holders and/or other storage compartments are often covered by sliding door assemblies that may be selectively opened and closed, providing access to the cup holders and/or other storage compartments when open and enhancing the aesthetic appearance of the vehicle interior when closed. These sliding door assemblies often include a retractable panel door that includes a plurality of interconnected slats, such that the sliding door assembly is flexible and may travel around a corner and be disposed within a hidden portion of the associated console. Such sliding door assemblies are also variously referred to as panel doors, slat doors, louvre doors, jalousie doors, etc. and are well known to persons of ordinary skill in the art.

FIG. 1 illustrates a conventional sliding door assembly 10. The sliding door assembly 10 typically includes a panel door 12 that includes a plurality of slats 14 that are pivotably linked together and/or disposed on a flexible substrate, for example. This flexibility allows the panel door 12 to cover a curved surface and/or travel around a corner as it is translated into and out of the hidden portion of the associated console. The slats 14 typically travel on a pair of opposed rails 16 that are coupled to the side panels 18 of the sliding door assembly 10. The cup holder and/or other storage compartment 5 typically also includes a body structure 20 that defines the storage compartment and includes one or more forms or cutouts for cup holders or other retainers, as well as a strictly optional cover structure 22 that also defines the storage compartment and includes one or more forms or cutouts for cup holders or other retainers. In general, the cup holder and/or other storage compartment 5 can include any number and configuration of components in any number of examples, provided that a storage space is generally defined.

Referring now specifically to FIG. 2, in a typical sliding door assembly 10, each slat 14 of the panel door 12 includes a tab 24 at either end with a corresponding notch 26 milled into the outer surface of the slat adjacent to the tab 24. This results in the outer surface of the panel door 12 being raised with respect to the constituent tabs 24. This raised portion is visible from within the interior of the vehicle and is often finished with a pleasing leather, wood grain, carbon fiber, or similar finish or appearance, while adjacent tabs 24 are covered by the rails 16 and/or finish trim, which form a visible frame for the panel door 12. Typically, the rails 16 are slotted or c-shaped, such that they encompass the adjacent tabs 24, forming opposed tracks along which the adjacent tabs 24 and associated slats 14 are translated in unison. The rails 16 follow the intended path of the panel door 12 and may include one or more curves or corners accordingly. The components of the sliding door assembly 10 may be manufactured from a plastic material or a metallic material, and the panel door 12 may include a handle at one end, such that the panel door 12 may be easily translated by a user using his or her fingers.

Disadvantageously, typical sliding door assemblies utilize numerous components and are prone to binding, with the adjacent tabs of the panel door getting stuck in the slots of the opposed rails, which are typically separate components secured to the body structure of the storage compartment using screws or the like. The tabs themselves must be milled. This creates challenging manufacturing tolerance issues, creating manufacturing inefficiencies. Thus, an improved sliding door assembly is still needed in the art.

SUMMARY

The present disclosure provides a sliding door assembly that overcomes these binding and tolerance issues, efficiently minimizing the number of components utilized, thereby streamlining the manufacturing process.

The sliding door assembly includes slats that are pivotably interconnected and/or disposed on a flexible substrate, but that utilize integral clamp structures at either end that are adapted to grasp the opposed rails, as opposed to tabs that are adapted to be disposed within slots of the opposed rails. Thus, the milled surfaces on the tops of the slats adjacent to the tabs serve only to receive a finish trim piece or the like and do not affect the translation of the panel door or function of the slider door assembly. This resulting in less exacting tolerances and a more efficient manufacturing process.

The opposed rails may be integrally formed with a cover panel for the cup holder and/or other storage compartment. Any number and configuration of other cup holder and/or other storage compartment components may also be utilized. Advantageously, with the opposed rails integrally formed with the cover panel, the spacing between the opposed rails is fixed and tolerance issues are not created, as may be the case with opposed rails that are later secured to the cover panel and other cup holder and/or other storage compartment components using screws or the like.

In one exemplary embodiment, the present disclosure provides a sliding door assembly for selectively covering a cup holder or other storage compartment of a vehicle, the sliding door assembly including: a pair of opposed rails adapted to be disposed on opposed sides of an opening of the cup holder or other storage compartment; and a panel door including a plurality of adjacent slats adapted to be disposed between the pair of opposed rails, wherein one or more of the plurality of adjacent slats includes a central body portion with a clamp structure disposed at each end of the central body portion, wherein each of the clamp structures is adapted to grasp one of the pair of opposed rails to translatably secure the panel door to the pair of opposed rails. Optionally, the plurality of adjacent slats of the panel door are pivotably interconnected to one another. Alternatively, the plurality of adjacent slats of the panel door are each coupled to a flexible substrate. The sliding door assembly also includes a cover panel adapted to be disposed between the pair of opposed rails adjacent to the panel door, wherein the cover panel defines one or more cutouts configured to provide access to an interior of the cup holder or other storage compartment when the panel door is translated open. Optionally, the cover panel and the pair of opposed rails are integrally formed. The sliding door assembly further includes a box interface structure adapted to be coupled to the cover panel opposite the panel door, wherein the box interface structure defines one or more cutouts configured to provide access to an interior of the cup holder or other storage compartment when the panel door is translated open. The sliding door assembly still further includes a box structure coupled to the box interface structure opposite the cover panel, wherein the box structure defines the interior of the cup holder or other storage compartment. Each of the clamp structures includes a tab structure protruding from an end of the associated slat and a hook structure coupled to an end of the tab structure, wherein the hook structure is adapted to grasp the associated rail to translatably secure the panel door to the rail.

In another exemplary embodiment, the present disclosure provides a panel door for selectively covering a cup holder or other storage compartment of a vehicle, the panel door including: a plurality of adjacent slats adapted to be disposed between a pair of opposed rails adapted to be disposed on opposed sides of an opening of the cup holder or other storage compartment, wherein one or more of the plurality of adjacent slats includes a central body portion with a clamp structure disposed at each end of the central body portion, wherein each of the clamp structures is adapted to grasp one of the pair of opposed rails to translatably secure the panel door to the pair of opposed rails. Optionally, the plurality of adjacent slats of the panel door are pivotably interconnected to one another. Alternatively, the plurality of adjacent slats of the panel door are each coupled to a flexible substrate. The pair of opposed rails also include a cover panel disposed between the pair of opposed rails, where the cover panel defines one or more cutouts configured to provide access to an interior of the cup holder or other storage compartment when the panel door is translated open. Optionally, the cover panel and the pair of opposed rails are integrally formed. Each of the clamp structures includes a tab structure protruding from an end of the associated slat and a hook structure coupled to an end of the tab structure, wherein the hook structure is adapted to grasp the associated rail to translatably secure the panel door to the rail.

In a further exemplary embodiment, the present disclosure provides a storage compartment of a vehicle, the storage compartment including: a cover panel; a pair of opposed rails adapted to be coupled to opposed sides of the cover panel; and a panel door including a plurality of adjacent slats adapted to be disposed between the pair of opposed rails, wherein one or more of the plurality of adjacent slats includes a central body portion with a clamp structure disposed at each end of the central body portion, wherein each of the clamp structures is adapted to grasp one of the pair of opposed rails to translatably secure the panel door to the pair of opposed rails. Optionally, the plurality of adjacent slats of the panel door are pivotably interconnected to one another. Alternatively, the plurality of adjacent slats of the panel door are each coupled to a flexible substrate. The cover panel defines one or more cutouts configured to provide access to an interior of the storage compartment when the panel door is translated open. Optionally, the cover panel and the pair of opposed rails are integrally formed. The storage compartment further includes one or more of: a box interface structure adapted to be coupled to the cover panel opposite the panel door, wherein the box interface structure defines one or more cutouts configured to provide access to an interior of the storage compartment when the panel door is translated open; and a box structure coupled to the box interface structure opposite the cover panel, wherein the box structure defines the interior of the storage compartment. Each of the clamp structures includes a tab structure protruding from an end of the associated slat and a hook structure coupled to an end of the tab structure, wherein the hook structure is adapted to grasp the associated rail to translatably secure the panel door to the rail.

BRIEF DESCRIPTION OF THE DRAWINGS

The present disclosure is illustrated and described with reference to the various drawings, in which like reference numbers are used to denote like assembly components/method steps, as appropriate, and in which.

DESCRIPTION OF EMBODIMENTS

Again, the present disclosure provides a sliding door assembly that overcomes binding and tolerance issues, efficiently minimizing the number of components utilized, thereby streamlining the manufacturing process.

The sliding door assembly includes slats that are pivotably interconnected and/or disposed on a flexible substrate, but that utilize integral clamp structures at either end that are adapted to grasp the opposed rails, as opposed to tabs that are adapted to be disposed within slots of the opposed rails. Thus, the milled surfaces on the tops of the slats adjacent to the tabs serve only to receive a finish trim piece or the like and do not affect the translation of the panel door or function of the slider door assembly. This resulting in less exacting tolerances and a more efficient manufacturing process.

The opposed rails may be integrally formed with a cover panel for the cup holder and/or other storage compartment. Any number and configuration of other cup holder and/or other storage compartment components may also be utilized. Advantageously, with the opposed rails integrally formed with the cover panel, the spacing between the opposed rails is fixed and tolerance issues are not created, as may be the case with opposed rails that are later secured to the cover panel and other cup holder and/or other storage compartment components using screws or the like.

Figure 1:
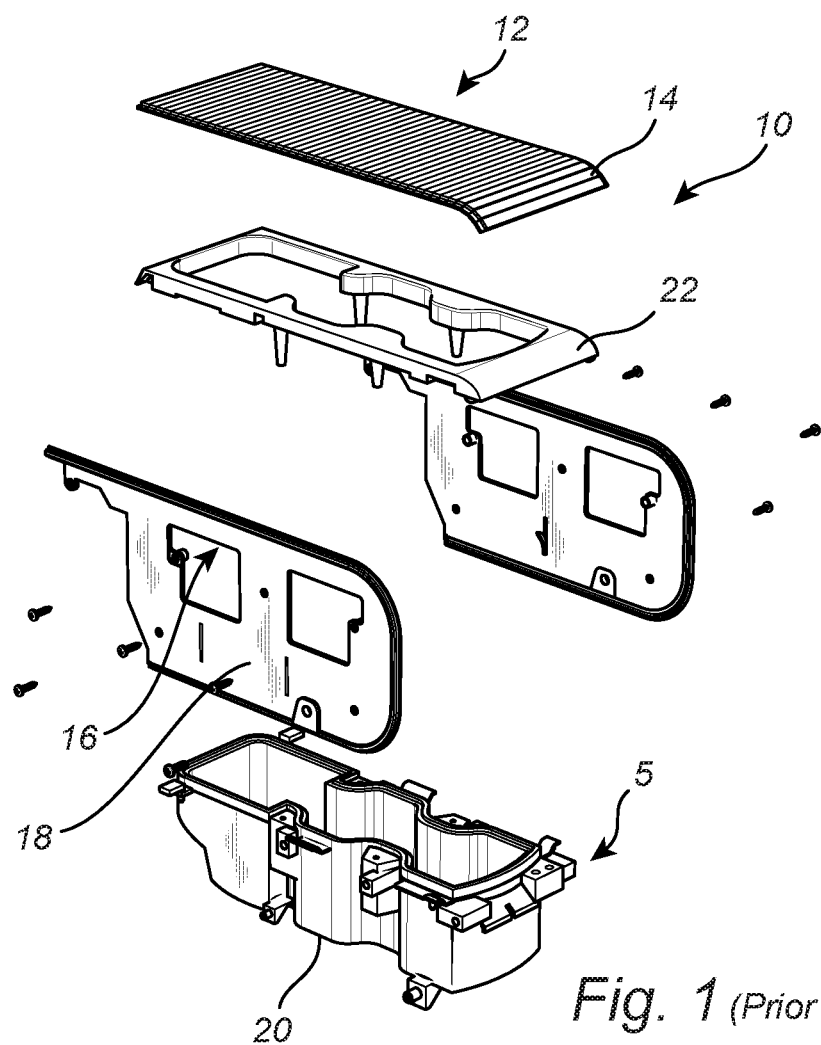
FIG. 1 is an exploded perspective view of a conventional cup holder and/or other storage compartment utilizing a conventional sliding door assembly.
Figure 3:
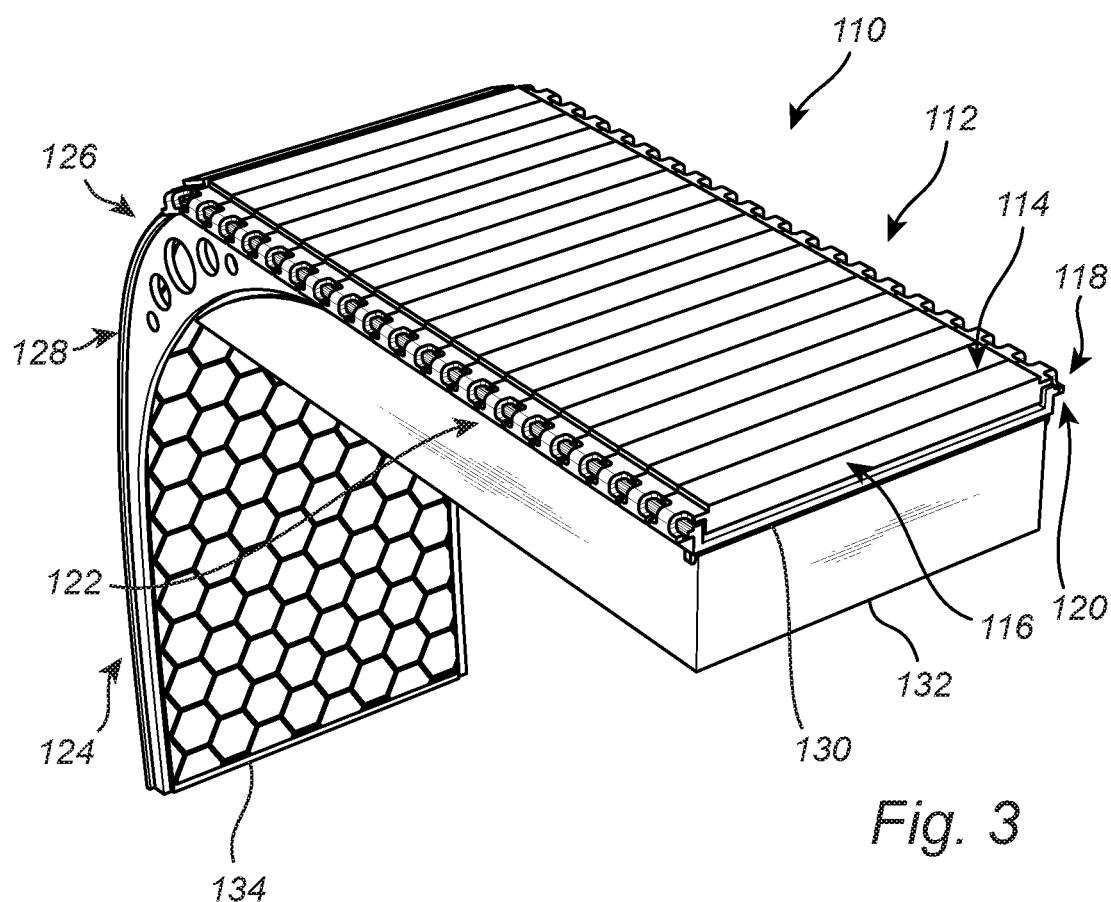
FIG. 3 is a perspective view of one exemplary embodiment of the sliding door assembly of the present disclosure.

Referring now specifically to FIG. 3, the sliding door assembly 110, utilizable with a vehicle cup holder and/or other storage compartment 5 (FIG. 1), includes a panel door 112 that is formed from a plurality of slats 114 that are pivotably interconnected and/or affixed to a flexible substrate or the like, such that the entire panel door is flexible and can conform to curves or bends when the panel door is translated open or closed. Each of the slats 114 includes a central body portion 116 and a clamp structure 118 disposed at each end. The slats 114 may be manufactured from a plastic material, a metallic material, or any other suitable rigid material, and may have a top exterior finish that is aesthetically appropriate for the interior of a vehicle, such as a leather finish, a wood grain finish, a carbon fiber finish, etc. In the case that the slats 114 are pivotably interconnected, each slat 114 may include one or more pin or loop protrusions suitable for engaging a loop or pin protrusion associated with an adjacent slat 114. In the case that the slats 114 are coupled to a flexible substrate, each slat may simply be affixed to the substrate, or may include top and bottom portions that are affixed to opposed sides of the substrate, such that the substrate traverses the centers of the adjacent slats 114. The flexible substrate itself can be made of a plastic material, a fabric material, etc. Again, a flexible panel door 112 that may cover and bend around and traverse curves is provided. Such panel doors 112 are also variously referred to as slat doors, louvre doors, jalousie doors, etc.

The clamp structures 118 disposed at the ends of each slat 114 are each adapted to grasp one of two opposed rails 120 that run along the opening of the cup holder and/or other storage compartment to be covered. Each of the rails 120 includes a first portion 122 that retains the panel door 112 in a closed position that is typically visible within the interior of the vehicle and a second portion 124 that retains the panel door 112 in an open position that is typically not visible within the interior of the vehicle. The first portion 122 may be adjacent to a cup holder within the center console of the interior of the vehicle such that the closed panel door 112 is visible, for example, while the second portion 124 may be within the center console of the interior of the vehicle such that the open panel door 112 is hidden within the center console, for example. Here, the first portion 122 and the second portion are disposed substantially perpendicular to one another and joined by a curved segment 126 that the panel door 112 must conform to when it is translated. This curved segment may include a reinforcing structure or the like.

To simplify assembly and eliminate tolerance issues associated with the sliding door assembly 110, the opposed rails 120 are formed on opposed sides of a cover panel 130 that is adapted to be snap engaged with, screwed to, and/or otherwise affixed to a box interface structure 132 that forms a top portion of the associated cup holder and/or other storage compartment box. For example, in the exemplary embodiment illustrated, the rails 120 are integrally formed with a cup holder cover panel 130. The cup holder cover panel 130 is adapted to be snapped to a cup holder box interface structure 132 that forms the top portion of the associated cup holder. Both the cover panel 130 and the box interface structure 132 define cutouts for cup access, access to a change compartment, access to a USB port, etc. As is conventional, all of the cup holder and/or other storage compartment components can be manufactured from a plastic material, a metallic material, or any other suitable rigid material.

As is illustrated, the first portion 122 of each of the opposed rails 120 may be integrally formed with the cover panel 120, while the second portions 124 of the opposed rails may be coupled via any number and configuration of connecting structures 134, provided that the opposed rails 120 are held in rigid alignment.

Figure 4:
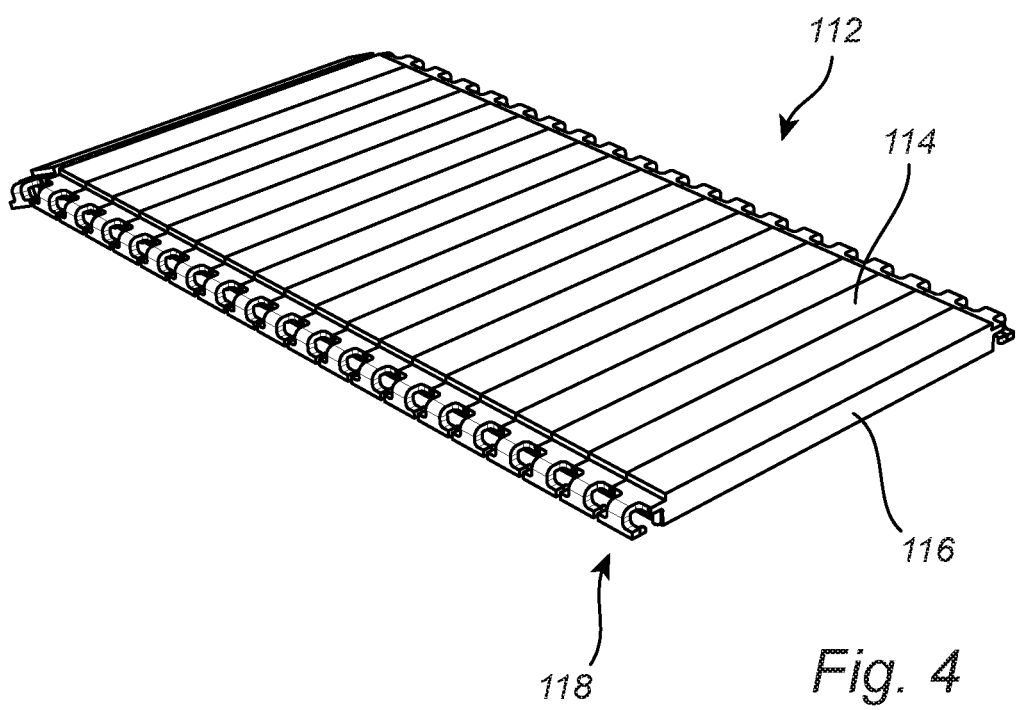
FIG. 4 is a perspective view of one exemplary embodiment of the panel door of the sliding door assembly of the present disclosure, highlighting the use of slats with end clamps.

The panel door 112 is isolated in FIG. 4. It can be seen that the center portions 116 of the adjacent slats 114 form the cover surface of the panel door 112, while the adjacent clamp structures 118 form a clamping mechanism that is adapted to securely grasp the associated rail 120 (FIG. 3). As illustrated, each of the slats 114 is clamped to the rail 120, however it is possible that only certain slats 114 may be clamped to the rail in this manner, with the other slats 114 essentially floating between the clamped slats 114. All the components illustrated can be manufactured from a plastic material, a metallic material, or any other suitable rigid material, while the flexible substrate, when used, can consist of a plastic material or a fabric material, for example.

Figure 5:
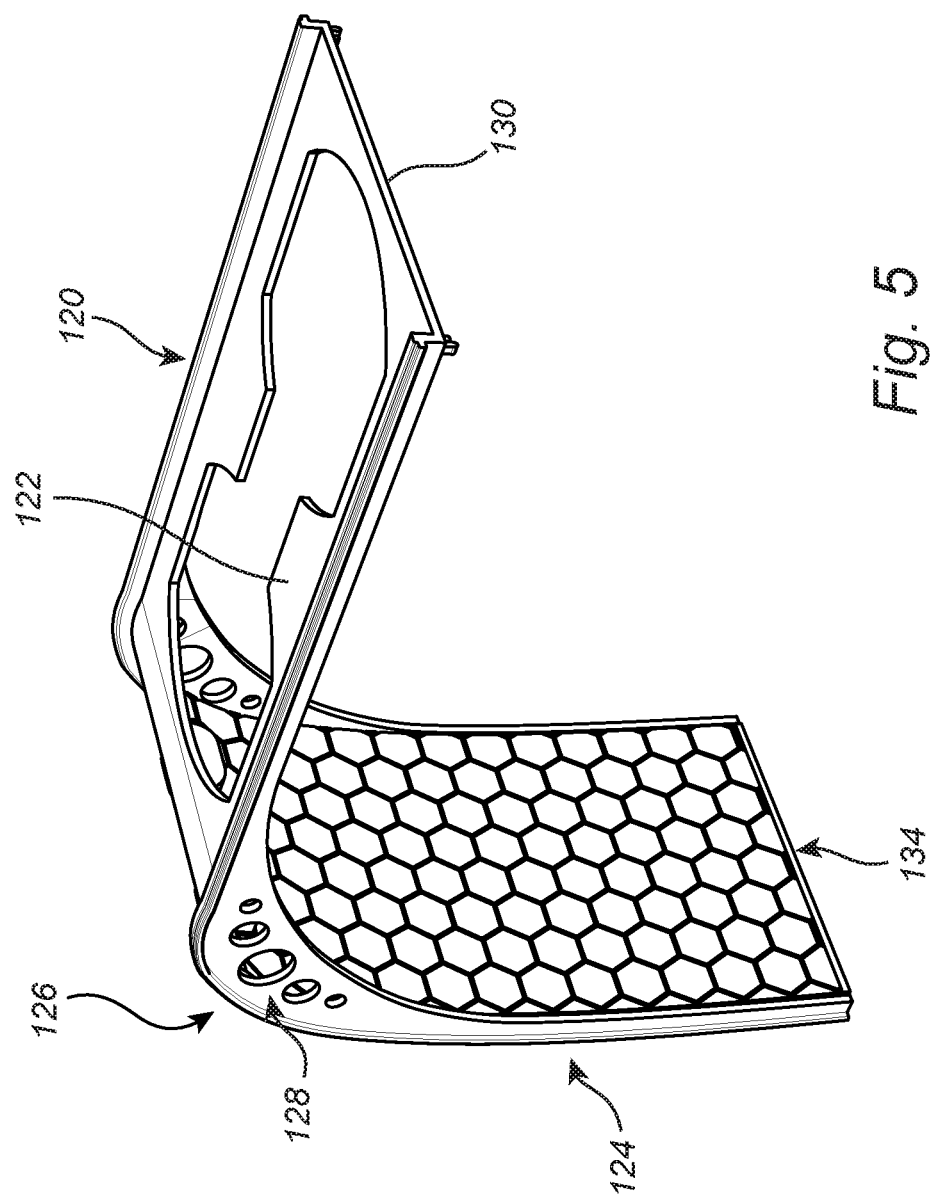
FIG. 5 is a perspective view of one exemplary embodiment of the opposed rails of the sliding door assembly of the present disclosure, highlighting the integration of the opposed rails with the cover panel.

The opposed rails 120 are isolated in FIG. 5. It can be seen that the rails 120 are integrally formed along the opposed sides of the cover panel 130, in this case for a cup holder. The first portions 122 of the rails 120 are joined to the second portions 124 of the rails 120 by the intervening curved portions 126, such that the rails 120, as a while, follow a desired contour and path that allows the panel door 112 (FIGS. 3 and 4) to be translated between a position above the cover panel 130 to a position hidden within the interior console, for example. A handle on the panel door 112 may be provided for this purpose. All the components illustrated can be manufactured from a plastic material, a metallic material, or any other suitable rigid material.

Figure 6:
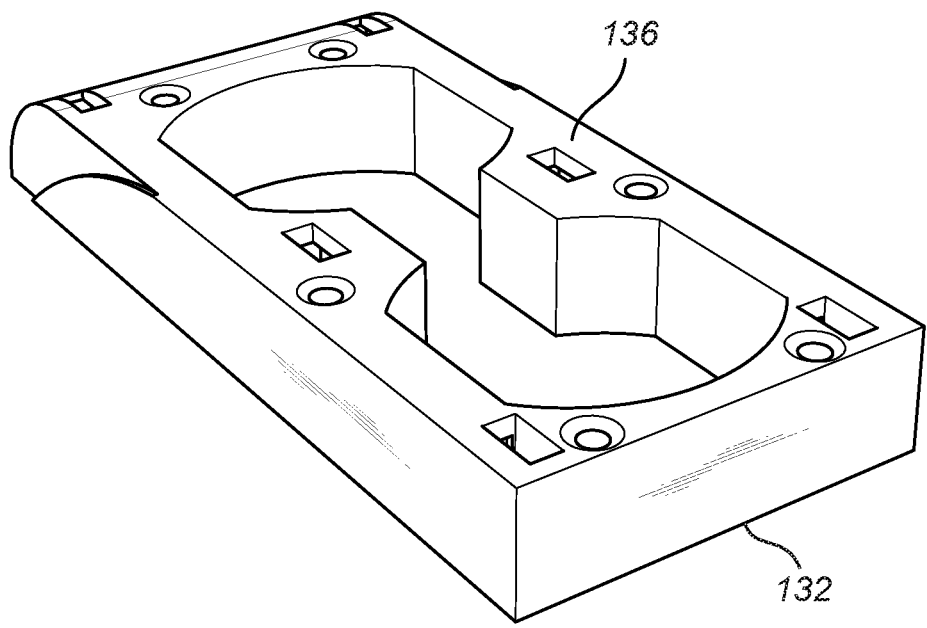
FIG. 6 is a perspective view of one exemplary embodiment of the lower box interface of the sliding door assembly of the present disclosure, and in this case, the lower cup holder box interface.

The box interface structure 132 is isolated in FIG. 6. Here, the box interface structure 132 consists of a cap piece for a cup holder box. The box interface structure 132 could also consist of a cap piece for another storage compartment box, and could be integrally formed with the cup holder box and/or other storage compartment box. These cup holder and/or other storage compartment components are not a focus of the present disclosure aside from their use of the sliding door assembly 110 (FIG. 3). As illustrated, the box interface structure 132 includes any number and configuration of fittings for receiving the cover panel 130 (FIGS. 3 and 5) and mating with the cup holder and/or other storage compartment components, as appropriate.

Figure 7:
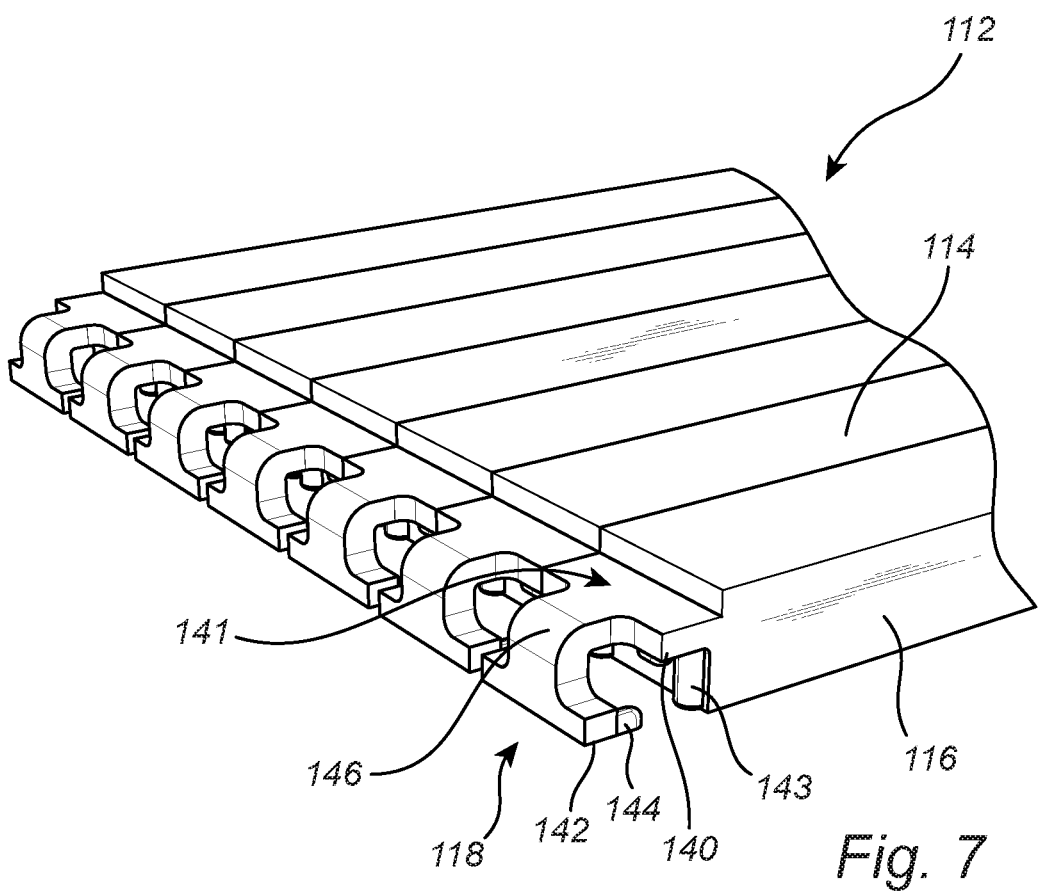
FIG. 7 is another perspective view of one exemplary embodiment of the panel door of the sliding door assembly of the present disclosure, highlighting the end clamps of the slats.
Figure 8:
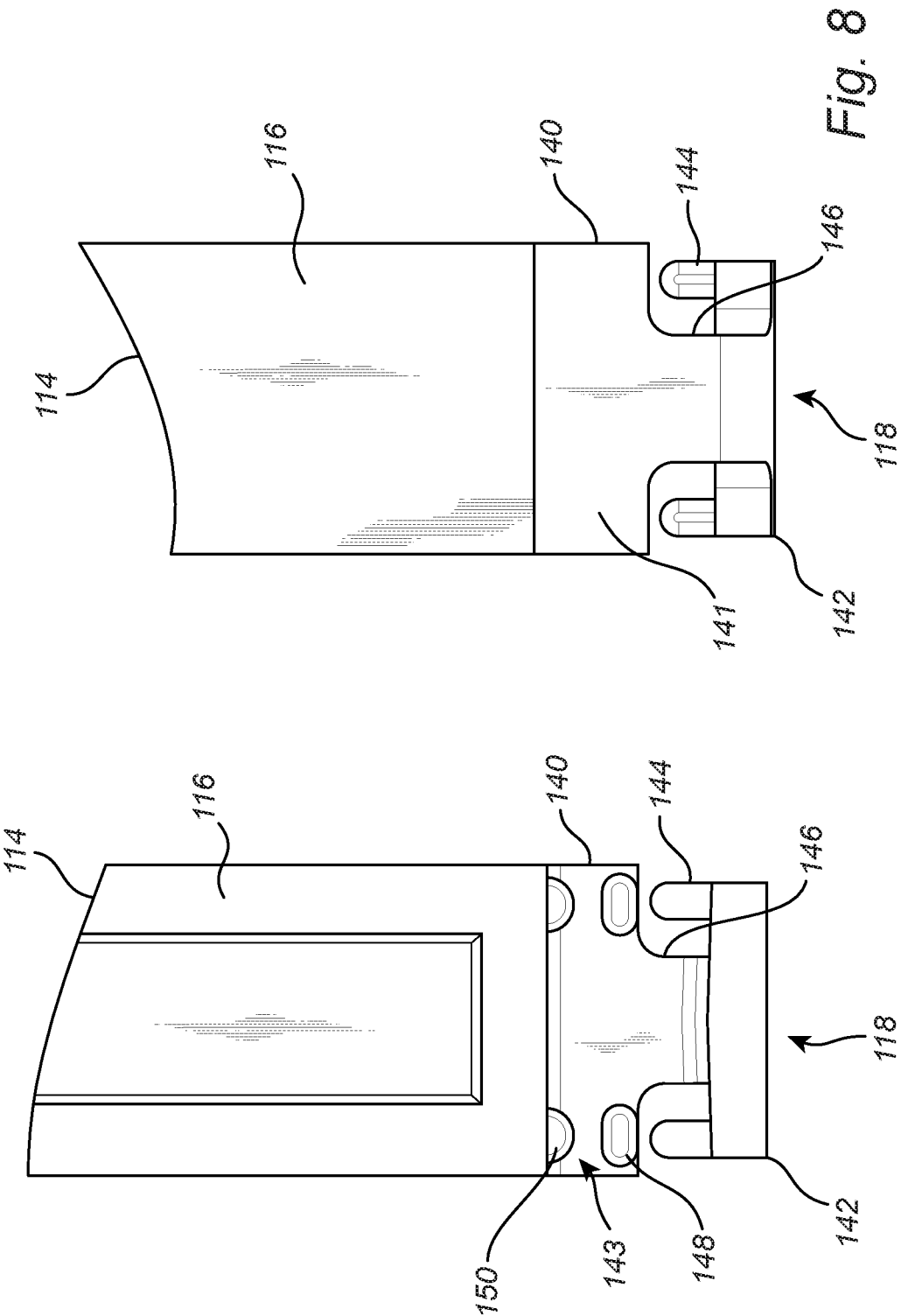
FIG. 8 is a planar view of one exemplary embodiment of the slats of the sliding door assembly of the present disclosure, highlighting the end clamps themselves.

Referring now specifically to FIGS. 7 and 8, each of the clamp structures 118 includes a tab structure 140 that protrudes longitudinally from the associated slat 114 along the major axis thereof. As illustrated, each of the tab structures 140 is planar and coextensive with the width of the slat 114, but this is not a requirement. Each of the tab structures 140 may be molded with the slat 114, or the slat 114 may in include a top milled portion 141 (horizontal and vertical) that forms the tab structure 140. Advantageously, the tolerances associated with this top milled portion 141 do not affect the function of the panel door 112 with respect to the associated rail 120 (FIGS. 3 and 5). This promotes manufacturing simplicity. The bottom portion of each tab structure 140 may also be recessed from the adjacent bottom surface of the slat 114, and includes one or more protrusions 148 that ride along the top of the associated rail 120, aiding in translation of the clamp structure 118 and slat 114 along the rail 120. Similarly, the longitudinal surface of the slat 114 adjacent to the bottom portion of each tab structure 140 may also include one or more protrusions 148 that ride along the inside of the associated rail 120, aiding in translation of the clamp structure 118 and slat 114 along the rail 120.

The tab structure 140 is coupled to a hook structure 142 by connecting strut 146 that essentially traverses a right angle with respect to the tab structure 140. The hook structure 142 includes a hook member 144 disposed at either end thereof. The hook structure 142 and hook members 144 are collectively adapted to grasp a lip of the associated rail 120, thereby securing the clamp structure 118 and slat 114 to the rail 120, while allowing the clamp structure 118 and slat 114 to translate along the rail 120. It will be readily apparent to those of ordinary skill in the art that a single hook member 144 coextensive with the hook structure 142 could also be used, for example. As illustrated, the connecting strut 146 is significantly narrower that the tab structure 140, while the hook structure 142 is slightly narrower than the tab structure 140, although this is not a requirement. The key aspect is that the slat 114 is hooked to the associated rail 120 such that it is coupled to but allowed to translate along the rail 120, with less binding than is experienced conventionally. As illustrated, the tolerances associated with the milled surface(s) are no longer as critical to the function of the panel door 112.

Figure 2:
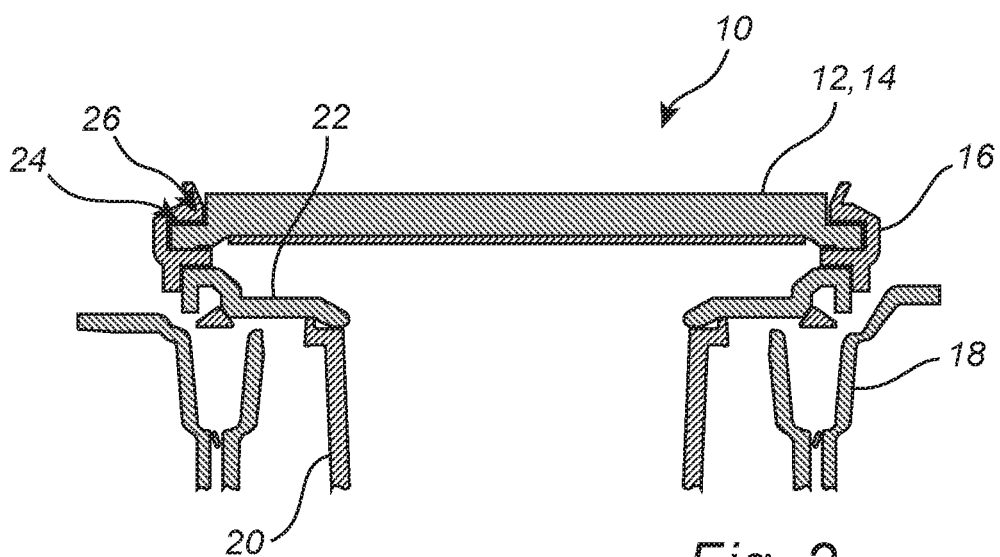
FIG. 2 is a cross-sectional view of a conventional cup holder and/or other storage compartment utilizing a conventional sliding door assembly.
Figure 9:
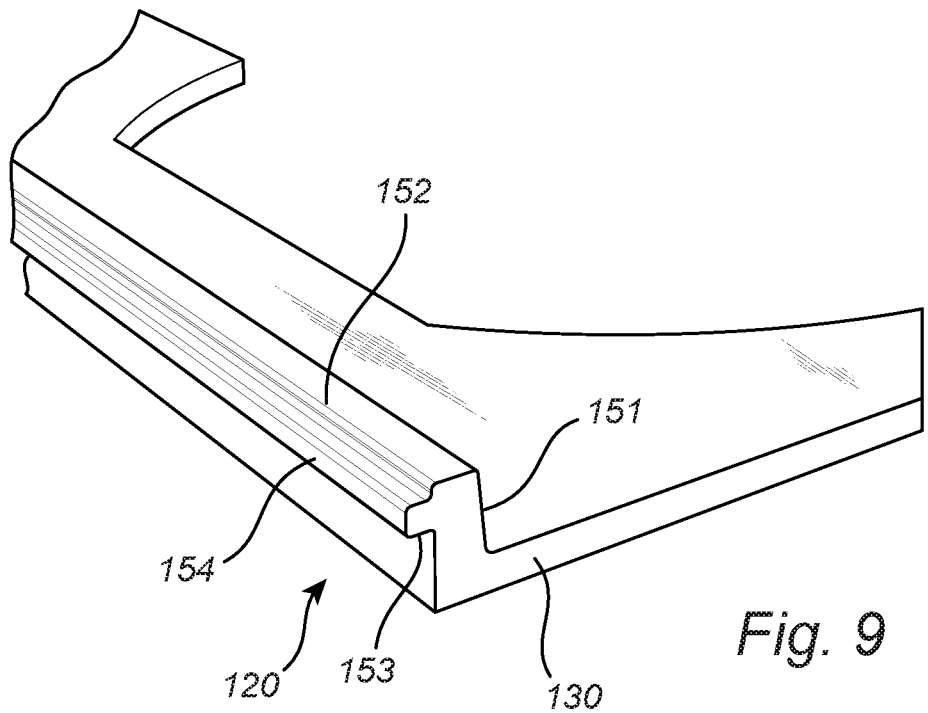
FIG. 9 is another perspective view of one exemplary embodiment of the opposed rails of the sliding door assembly of the present disclosure, highlighting the rails themselves.

FIG. 9 illustrates one of the opposed rails 120 in greater detail. The rail 120 includes a vertical portion 151 that protrudes from the associated cover panel 130. The top surface of this vertical portion 151 forms a top rail surface 152, while a lip structure 153 disposed coextensively along an outside of the vertical portion 151 forms an outside rail surface 152. The clamp structure 118 (FIGS. 3, 4, 7, and 8) grasps this lip structure 153, with the hook members 144 (FIGS. 7 and 8) riding along the bottom of the lip structure 153 while the protrusions 148 (FIGS. 7 and 8) of the tab structure 140 (FIGS. 7 and 8) ride along the top rail surface 152 and the protrusions 150 (FIGS. 7 and 8) of the slat 114 (FIGS. 3, 4, 7, and 8) ride along the inside surface of the vertical portion 151 of the rail 120. The clamp structure 118 imparts the assembly with a degree of tolerance flexibility as it encompasses the rail 120. This is fundamentally different from the conventional c-shaped rail 16 (FIGS. 1 and 2) that encompasses a milled tab 24 (FIG. 2), which has tight tolerances and is prone to binding.

Figure 10:
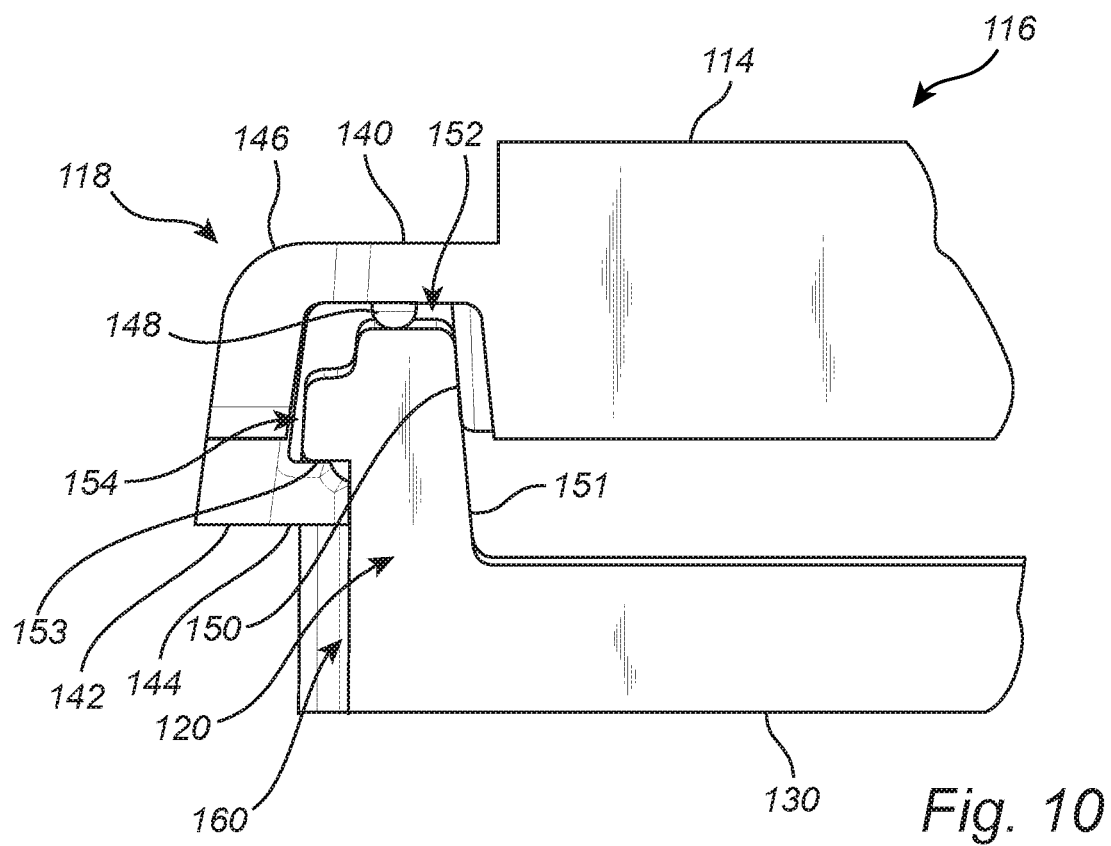
FIG. 10 is a cross-sectional view of one exemplary embodiment of the sliding door assembly of the present disclosure, highlighting the interaction of the end clamps of the slats with a rail of the opposed rails.

As illustrated in FIG. 10, the clamp structure 118 grasps this lip structure 153, with the hook members 144 riding along the bottom of the lip structure 153. In this exemplary embodiment, the hook members 144 also contact the outside surface of the vertical portion 151 of the rail 120, although this is not a requirement. Contact is also limited between the hook structure 142 and the connecting strut 146 and the lip structure 153, which promotes easy translation between the components. The protrusions 148 of the tab structure 140 ride along the top rail surface 152 and the protrusions 150 of the slat 114 ride along the inside surface of the vertical portion 151 of the rail 120, with the outer surface 160 of the cover panel 130 not being significantly contacted by the bulk of the clamp structure 118. Again, the clamp structure 118 imparts the assembly with a degree of tolerance flexibility as it encompasses the rail 120. This is fundamentally different from the conventional c-shaped rail 16 (FIGS. 1 and 2) that encompasses a milled tab 24 (FIG. 2), which has tight tolerances and is prone to binding.

Thus, the present disclosure provides a sliding door assembly that overcomes binding and tolerance issues, efficiently minimizing the number of components utilized, thereby streamlining the manufacturing process.

The sliding door assembly includes slats that are pivotably interconnected and/or disposed on a flexible substrate, but that utilize integral clamp structures at either end that are adapted to grasp the opposed rails, as opposed to tabs that are adapted to be disposed within slots of the opposed rails. Thus, the milled surfaces on the tops of the slats adjacent to the tabs serve only to receive a finish trim piece or the like and do not affect the translation of the panel door or function of the slider door assembly. This resulting in less exacting tolerances and a more efficient manufacturing process.

The opposed rails may be integrally formed with a cover panel for the cup holder and/or other storage compartment. Any number and configuration of other cup holder and/or other storage compartment components may also be utilized. Advantageously, with the opposed rails integrally formed with the cover panel, the spacing between the opposed rails is fixed and tolerance issues are not created, as may be the case with opposed rails that are later secured to the cover panel and other cup holder and/or other storage compartment components using screws or the like.

Although the present disclosure is illustrated and described with reference to preferred embodiments and specific examples thereof, it will be readily apparent to persons of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A sliding door assembly for selectively covering a cup holder or other storage compartment of a vehicle, the sliding door assembly comprising:
   a pair of opposed rails adapted to be disposed on opposed sides of an opening of the cup holder or other storage compartment; and
   a panel door comprising adjacently disposed slats sized to fit between the pair of opposed rails, at least one of the slats having a clamp structure, disposed at each end of a central body portion thereof, and configured to be disposed around and grasp one of the pair of opposed rails so as to translatably secure the panel door to the pair of opposed rails.

2. The sliding door assembly of claim 1, wherein the plurality of adjacent slats of the panel door are pivotably interconnected to one another.

3. The sliding door assembly of claim 1, wherein the plurality of adjacent slats of the panel door are each coupled to a flexible substrate.

4. The sliding door assembly of claim 1, further comprising a cover panel adapted to be disposed between the pair of opposed rails adjacent to the panel door, wherein the cover panel defines one or more cutouts configured to provide access to an interior of the cup holder or other storage compartment when the panel door is translated open.

5. The sliding door assembly of claim 4, wherein the cover panel and the pair of opposed rails are integrally formed.

6. The sliding door assembly of claim 4, further comprising a box interface structure adapted to be coupled to the cover panel opposite the panel door, wherein the box interface structure defines one or more cutouts configured to provide access to an interior of the cup holder or other storage compartment when the panel door is translated open.

7. The sliding door assembly of claim 6, further comprising a box structure coupled to the box interface structure opposite the cover panel, wherein the box structure defines the interior of the cup holder or other storage compartment.

8. The sliding door assembly of claim 1, wherein each of the clamp structures comprises a tab structure protruding from an end of the associated slat and a hook structure coupled to an end of the tab structure, wherein the hook structure is adapted to grasp the associated rail to translatably secure the panel door to the rail.

9. A panel door for selectively covering a cup holder or other storage compartment of a vehicle, the panel door comprising:
a plurality of adjacently disposed slats sized to fit between a pair of opposed rails adapted to be disposed on opposed sides of an opening of the cup holder or other storage compartment, at least one of the slats having a clamp structure, disposed at each end of a central body portion thereof, and configured to be disposed around and grasp one of the pair of opposed rails so as to translatably secure the panel door to the pair of opposed rails.

10. The panel door of claim 9, wherein the plurality of adjacent slats of the panel door are pivotably interconnected to one another.

11. The panel door of claim 9, wherein the plurality of adjacent slats of the panel door are each coupled to a flexible substrate.

12. The panel door of claim 9, where the pair of opposed rails further include a cover panel disposed between the pair of opposed rails, where the cover panel defines one or more cutouts configured to provide access to an interior of the cup holder or other storage compartment when the panel door is translated open.

13. The panel door of claim 12, where the cover panel and the pair of opposed rails are integrally formed.

14. The panel door of claim 9, wherein each of the clamp structures comprises a tab structure protruding from an end of the associated slat and a hook structure coupled to an end of the tab structure, wherein the hook structure is adapted to grasp the associated rail to translatably secure the panel door to the rail.

15. A storage compartment of a vehicle, the storage compartment comprising:
a cover panel;
a pair of opposed rails adapted to be coupled to opposed sides of the cover panel; and
a panel door comprising adjacently disposed slats sized to fit between the pair of opposed rails, at least one of the slats having a clamp structure, disposed at each end of a central body portion thereof, and configured to be disposed around and grasp one of the pair of opposed rails so as to translatably secure the panel door to the pair of opposed rails.

16. The storage compartment of claim 15, wherein the plurality of adjacent slats of the panel door are pivotably interconnected to one another.

17. The storage compartment of claim 15, wherein the plurality of adjacent slats of the panel door are each coupled to a flexible substrate.

18. The storage compartment of claim 15, wherein the cover panel defines one or more cutouts configured to provide access to an interior of the storage compartment when the panel door is translated open.

19. The storage compartment of claim 15, wherein the cover panel and the pair of opposed rails are integrally formed.

20. The storage compartment of claim 15, further comprising one or more of:
a box interface structure adapted to be coupled to the cover panel opposite the panel door, wherein the box interface structure defines one or more cutouts configured to provide access to an interior of the storage compartment when the panel door is translated open; and
a box structure coupled to the box interface structure opposite the cover panel, wherein the box structure defines the interior of the storage compartment.

21. The storage compartment of claim 15, wherein each of the clamp structures comprises a tab structure protruding from an end of the associated slat and a hook structure coupled to an end of the tab structure, wherein the hook structure is adapted to grasp the associated rail to translatably secure the panel door to the rail.

* * * * *